United States Patent
Ben Abdelaziz et al.

(10) Patent No.: US 11,889,198 B2
(45) Date of Patent: Jan. 30, 2024

(54) IMAGE CAPTURE DEVICE AND VEHICLE COMPRISING SUCH AN IMAGE CAPTURE DEVICE

(71) Applicant: FAURECIA INTERIEUR INDUSTRIE, Nanterre (FR)

(72) Inventors: Omar Ben Abdelaziz, Tille (FR); Amine Ben Mhamed, Beauvais (FR)

(73) Assignee: FAURECIA INTERIEUR INDUSTRIE, Nanterre (FR)

( * ) Notice: Subject to any disclaimer, the term of this patent is extended or adjusted under 35 U.S.C. 154(b) by 31 days.

(21) Appl. No.: 17/535,900

(22) Filed: Nov. 26, 2021

(65) Prior Publication Data
US 2022/0166914 A1    May 26, 2022

(30) Foreign Application Priority Data
Nov. 26, 2020  (FR) ...................................... 20 12210

(51) Int. Cl.
*H04N 23/74* (2023.01)
*H04N 23/51* (2023.01)
*H04N 23/52* (2023.01)

(52) U.S. Cl.
CPC ............. *H04N 23/74* (2023.01); *H04N 23/51* (2023.01); *H04N 23/52* (2023.01)

(58) Field of Classification Search
CPC ......... H04N 23/74; H04N 23/51; H04N 23/52
USPC ....................................................... 348/148
See application file for complete search history.

(56) References Cited

U.S. PATENT DOCUMENTS

| | | | |
|---|---|---|---|
| 10,773,725 B1 * | 9/2020 | Ilievski | B60W 60/0015 |
| 2005/0082480 A1 * | 4/2005 | Wagner | G02B 5/208 |
| | | | 348/E5.09 |
| 2006/0163481 A1 * | 7/2006 | Huang | G08B 13/19619 |
| | | | 348/E5.029 |
| 2008/0122936 A1 * | 5/2008 | Lomnes | A61B 6/04 |
| | | | 348/E5.025 |
| 2012/0305770 A1 * | 12/2012 | Minera | A41D 1/002 |
| | | | 250/206 |
| 2014/0218520 A1 * | 8/2014 | Teich | H04N 23/71 |
| | | | 348/165 |
| 2015/0373286 A1 * | 12/2015 | Matsuoka | G06T 5/50 |
| | | | 348/165 |

(Continued)

FOREIGN PATENT DOCUMENTS

WO    0110129 A1    2/2001

OTHER PUBLICATIONS

French Search Report corresponding to French Application No. FR 2012210, dated Jul. 7, 2021, 2 pages.

*Primary Examiner* — Matthew David Kim
(74) *Attorney, Agent, or Firm* — Reising Ethington P.C.

(57) ABSTRACT

An image capture device having a housing containing a first image capture apparatus configured to acquire images in a first wavelength range, the first image capture apparatus being a thermal camera or a thermal photographic apparatus, a second image capture apparatus configured to acquire images in a second wavelength range disjoint from the first wavelength range, and an illumination system for emitting radiation in the second wavelength range. The image capture device includes a thermal isolation partition interposed between the first image capture apparatus and the illumination system so as to thermally isolate the first image capture apparatus from the illumination system.

19 Claims, 1 Drawing Sheet

(56) References Cited

U.S. PATENT DOCUMENTS

| | | | |
|---|---|---|---|
| 2018/0215233 A1* | 8/2018 | Neveu | G01J 5/0025 |
| 2018/0225890 A1* | 8/2018 | Jales Costa | G07C 5/006 |
| 2018/0266672 A1* | 9/2018 | Gabriel | F21V 29/83 |
| 2018/0302564 A1 | 10/2018 | Liu | |
| 2019/0311180 A1 | 10/2019 | Tang et al. | |
| 2019/0373090 A1* | 12/2019 | Zeng | H04M 1/0277 |
| 2021/0022948 A1* | 1/2021 | Musallam | A61K 35/19 |
| 2022/0338327 A1* | 10/2022 | Mochizuki | B60Q 1/249 |

* cited by examiner

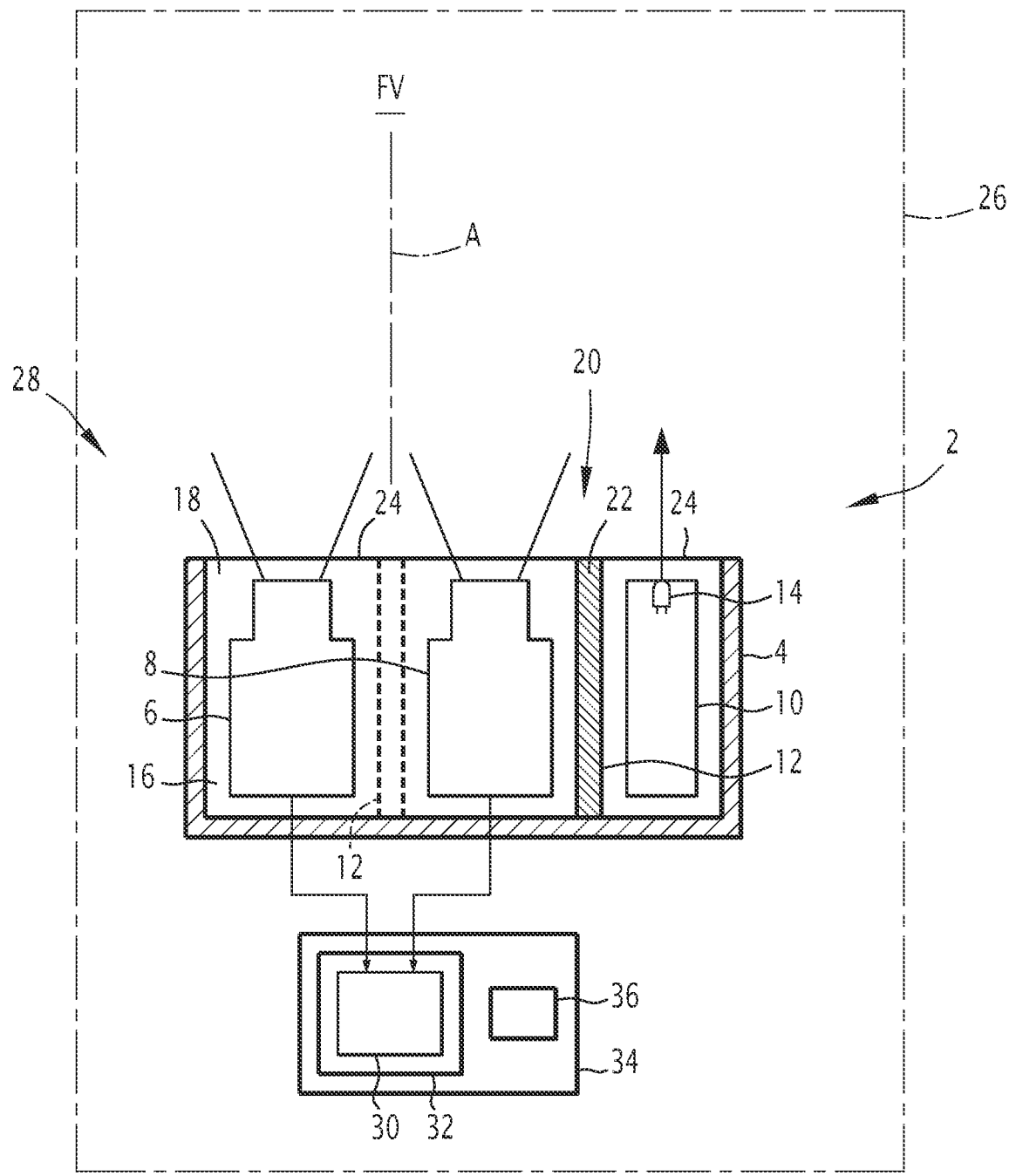

IMAGE CAPTURE DEVICE AND VEHICLE COMPRISING SUCH AN IMAGE CAPTURE DEVICE

TECHNICAL FIELD

The present invention relates to an image capture device, in particular an image capture device comprising a first image capture apparatus and a second image capture apparatus configured to acquire images in separate wavelength ranges.

BACKGROUND

US20180302564A1 discloses an image capture device comprising a thermal camera configured to acquire images in the far-infrared and/or mid-infrared range, an NIR (acronym of near-infrared) camera configured to acquire images in the near-infrared range, and an illumination system to illuminate the scene with radiation in the near-infrared range.

SUMMARY

One object of the invention is to provide an image capture device that is easy to integrate into a more complex system, and reliable.

To this end, at least one aspect of the invention provides an image capture device for capturing images of a scene within a field of view of the image capture device, the image capture device comprising a housing within which are positioned a first image capture apparatus configured to acquire images in a first wavelength range, the first image capture apparatus being a thermal camera or a thermal photographic apparatus, a second image capture apparatus configured to acquire images in a second wavelength range separate from the first wavelength range, and an illumination system comprising at least one radiation source and configured to emit radiation, from each radiation source, in the second wavelength range, the image capture device further comprising a thermal isolation partition positioned within the housing and interposed between the first image capture apparatus and the illumination system so as to thermally isolate the first image capture apparatus from the illumination system.

The grouping of the first image capture apparatus, the second image capture apparatus, and the lighting system in a single housing provides the image capture device as a unit that can be easily integrated into a vehicle.

The arrangement of the thermal partition between the lighting system and the first image capture apparatus reduces the risk of disturbance of the first image capture apparatus by the lighting system, in particular by heat emitted by the lighting system.

According to particular embodiments, the image capture device comprises one or more of the following optional features, taken individually or in any technically possible combination:
 the second image capture apparatus is positioned within the housing by being interposed between the first image capture apparatus and the lighting system;
 the thermal isolation partition is positioned within the housing and interposed between the second image capture apparatus and the illumination system;
 the first wavelength range is within a wavelength band between 1.4 µm and 1,000 µm;
 the second image capture apparatus is a near infrared photographic photographic apparatus or a near infrared camera;
 the second wavelength range is within a wavelength band between 0.750 µm and 1.4 µm;
 the illumination system is configured not to emit radiation within the first wavelength range using with each radiation source;
 each radiation source is a light emitting diode.

The invention also relates to a vehicle, in particular a motor vehicle, equipped with an image capture device as defined above.

BRIEF DESCRIPTION OF THE DRAWING

The invention and its advantages will be better understood upon reading the following description, given only as a non-limiting example, and made with reference to the appended drawing in which the single FIGURE schematically illustrates an image capture device positioned in a vehicle.

DETAILED DESCRIPTION

As illustrated in the FIGURE, an image capture device 2 is configured to acquire images of a scene located in a field of view FV. The image capture device 2 has an axis of view A, with the field of view FV centered on the axis of view A.

The image capture device 2 includes a housing 4 containing a first image capture apparatus 6, a second image capture apparatus 8, an illumination system 10, and a thermal isolation partition 12.

The first image capture apparatus 6 and the second image capture apparatus 8 are each arranged to capture images of the scene, substantially along the viewing axis A.

The first image capture apparatus 6 is a photographic apparatus or a camera, for example. The second image capture apparatus 8 is a photographic apparatus or a camera, for example.

An "image capture apparatus configured to acquire images in a wavelength range" means an image capture apparatus configured to acquire images from electromagnetic radiation (or "radiation" hereinafter) that has a wavelength within said wavelength range.

The first image capture apparatus 6 is configured to acquire images in a first wavelength range.

In one exemplary embodiment, the first image capture apparatus 6 is a thermal camera or a thermal photographic apparatus.

In one exemplary embodiment, the first wavelength range is in the far infrared range, i.e., wavelengths between 8 µm and 1,000 µm, and/or in the mid-infrared range, i.e., wavelengths between 1.4 µm and 8 µm.

In one particular exemplary embodiment, the first wavelength range is between 5 µm and 7 µm.

Radiation in the far infrared and mid infrared range, particularly in the wavelength band specified above, is radiation known as "thermal".

Thermal radiation is emitted spontaneously, especially by people.

The detection of thermal radiation emitted by a person allows the presence of this person to be determined, and may allow this person's physiological state to be determined, for example, by analyzing the intensity of the thermal radiation and/or the distribution of the thermal radiation as a function of its intensity on at least one part of the person's body, in particular the face.

The second image capture apparatus 8 is configured to acquire images in a second wavelength range separate from the first wavelength range.

Preferably, the wavelengths in the second wavelength range are smaller than those in the first wavelength range.

In one exemplary embodiment, the second image capture apparatus 8 is a near infrared photographic apparatus or a near infrared camera.

In one exemplary embodiment, the second wavelength range is in the near infrared range, i.e., wavelengths between 0.750 µm and 1.4 µm.

In one particular exemplary embodiment, the second wavelength range is between 0.850 µm and 0.940 µm.

The illumination system 10 comprises one or more radiation source(s) 14, with the illumination system 10 configured so that each radiation source 14 emits radiation in the second wavelength range.

The illumination system 10 is configured for illumination of the scene by each radiation source 14 generating radiation in the second wavelength range, so as to enable acquisition of images of the scene in the second wavelength range by the second image capture apparatus 8.

Objects, and in particular people, spontaneously emit little or no radiation in a range such as the near-infrared or visible range. Illumination of the scene by the illumination system 10 allows for the capture of images of the scene in the second wavelength range, using the second image capture apparatus 8.

Illumination of the scene in the second wavelength range included in the non-visible, near-infrared range allows the scene to be illuminated in a wavelength range in which a person in the scene has little or no sensitivity, thereby avoiding disturbance to that person.

Preferably, the lighting system 10 is configured such that each radiation source 14 does not emit radiation in the first wavelength range.

This prevents the radiation emitted by each radiation source 14 from being detected by the first image capture apparatus 6.

In particular, preferably, the illumination system 10 is configured such that each radiation source 14 emits radiation only in the second wavelength range.

In one exemplary embodiment, each radiation source 14 is for example a light emitting diode (or LED).

In a manner known per se, the wavelength of the radiation emitted by each radiation source 14 provided in the form of a light emitting diode depends in particular on the radiation source itself and the supply current during operation.

The thermal isolation partition 12 is arranged inside the housing 4 with being interposed between the first image capture apparatus 6 and the lighting system 10.

Thus, the first image capture apparatus 6 is separated from the lighting system 10 by the thermal isolation partition 12, which makes it possible to protect the first image capture apparatus 6 from the heat generated by the lighting system 10 during operation of the latter. This heat is generated by a power supply electronics of each radiation source 14, for example, and/or by each radiation source 14.

The thermal isolation partition 12 is for example attached to the interior of the housing 4.

The thermal isolation partition 12 is for example made of a material different from a material the housing 4 is made of.

Advantageously, the heat isolation partition 12 is made of a material having a low thermal conductivity, in particular a lower thermal conductivity than the material that the housing 4 is made of.

In one exemplary embodiment, the housing 4 is made of metal, in particular aluminum or magnesium.

In one exemplary embodiment, the thermal isolation partition 12 is made of a thermal isolation material, in particular a thermal isolation material formed of fibers, such as fibers marketed under the Nomex® brand name.

In a variant, the thermal isolation partition 12 is made of the same material as the housing 4.

In one particular embodiment, the thermal isolation partition 12 is made in one piece of material with the housing 4.

Preferably, the second image capture apparatus 8 is positioned inside the housing 4 while also being interposed between the first image capture apparatus 6 and the lighting system 10.

Thus, the first image capture apparatus 6 is separated from the lighting system 10 both by the thermal isolation partition 12 and by the second image capture apparatus 8.

This protects the first image capture apparatus 6 from heat generated by the illumination system 10, due to the fact that the first image capture apparatus 6 is spaced from the illumination system 10 within the housing 4, and the second image capture apparatus 8 and the thermal isolation partition 12 are interposed between the first image capture apparatus 6 and the illumination system 10.

Preferably, the first image capture apparatus 6, the second image capture apparatus 8, the thermal isolation partition 12, and the illumination system 10 are aligned along an alignment direction E, with the second image capture apparatus 8 and the thermal isolation partition 12 located between the first image capture apparatus 6 and the illumination system 10.

The alignment direction E is perpendicular to the viewing axis A of the image capture device 2.

Preferably, and as illustrated in FIG. 1, the thermal isolation partition 12 is positioned between the second image capture apparatus 8 and the illumination system 10.

Thus, the second image capture apparatus 8 is also thermally isolated from the lighting system 10 by the thermal isolation partition 12.

In the preferred embodiment, the first image capture apparatus 6, the second image capture apparatus 8, the thermal isolation partition 12, and the illumination system 10 are arranged within the housing 4, aligned in this order along the alignment direction E.

The second image capture apparatus 8 is interposed between the first image capture apparatus 6 and the illumination system 10, the thermal isolation partition 12 being further interposed between the second image capture apparatus 8 and the illumination system 10.

The housing 4 defines an inner space 16 within which the first image capture apparatus 6, the second image capture apparatus 8, the lighting system 10, and the thermal isolation partition 12 are received.

In the illustrated embodiment, the thermal isolation partition 12 delimits a first compartment 18 and a second compartment 20 within the housing 4, thermally isolated from each other by the thermal isolation partition 12.

The first image capture apparatus 6 is received in the first compartment 18, with the lighting system 10 received in the second compartment 20.

The second image capture apparatus 8 is for example received in the first compartment 18, preferably interposed between the first image capture apparatus 6 and the thermal isolation partition 12.

The thermal isolation partition 12 isolates the first image capture apparatus 6 from the thermal radiation of the lighting system 10.

Advantageously, the thermal isolation partition 12 separates the first compartment 18 and the second compartment 20 in a sealed manner. Thus, the thermal isolation partition 12 prevents heat generated by the lighting system 10 from spreading by convection from the second compartment 20 in which the lighting system 10 is located to the first compartment 18 in which the first image capture apparatus 6 is located.

The housing 4 has a front face 22 facing the field of view FV of the image capture device 2, with the first image capture apparatus 6 and the second image capture apparatus 8 positioned within the housing 4 configured to capture images of the scene from this front face 22, and the lighting system 10 configured to illuminate the scene from this front face 22.

In one exemplary embodiment, the front face 22 comprises one or more apertures 24, with each of the first image capture apparatus 6, the second image capture apparatus 8, and the illumination system 10 being positioned opposite a related aperture 24 to capture images of the scene through the related aperture 24 or illuminate the scene through the related aperture 24, as appropriate.

In one exemplary embodiment, one respective aperture 24 is provided for each of the first image capture apparatus 6, the second image capture apparatus 8 and the illumination system 10.

In a variant, one aperture 24 is associated with at least two of the first image capture apparatus 6, the second image capture apparatus 8 and the lighting system 10.

In a particular example, the front face 22 comprises a common aperture 24 associated with the first image capture apparatus 6, the second image capture apparatus 8 and the lighting system 10.

In operation, the first image capture apparatus 6 captures images of the scene in front of the image capture device 2 in the first wavelength range. The illumination system 10 illuminates the scene with radiation emitted from each radiation source 14. The second image capture apparatus 8 captures images of the scene illuminated by the illumination system 10 in the second wavelength range.

Preferably, the radiation emitted by the lighting system 10 is outside the first wavelength range, so that the first image capture apparatus 6 is not disturbed by the radiation emitted by each radiation source of the lighting system 10.

The arrangement of the various elements within the housing 4 (first image capture apparatus 6, second image capture apparatus 8, lighting system 10 and the thermal isolation partition 12) allows the first image capture apparatus 6 to be protected from the heat emitted by the lighting system 10 during its operation, and which could disturb the operation of the first image capture apparatus 6.

The arrangement of the various components attached within a single housing 4 provides an image capture device 2 that can be handled as a single unit. This makes it easier to assemble and connect it to a more complex system.

The first image capture apparatus 6 and the second image capture apparatus 8 are fixed in the same housing 4 in predetermined relative positions, which facilitates image processing when matches need to be made between images captured by the first image capture apparatus 6 and the second image capture apparatus 8.

The image capture device 2 equips a vehicle 26, for example, such as a motor vehicle 26.

In one exemplary embodiment, the image capture device 2 is arranged such that the scene is located inside the vehicle 26, and in particular such that the scene includes the passenger compartment of the vehicle 26.

Such an image capture device 2 can for example detect the presence of occupants in the passenger compartment and/or detect each occupant's physiological state by analysis of the captured images, for example based on the thermal radiation emitted by each occupant and its distribution on at least a part of the body of each occupant, for example on the face of each occupant.

In one exemplary embodiment, a detection system 28 comprises the image capture device 2 and a processing module 30 configured to automatically process images captured by the image capture device 2.

The processing module 30 is configured to analyze the images captured by the image capture device 2, for example, namely the images captured by the first image capture apparatus 6 and the images captured by the second image capture apparatus 8.

The processing module 30 is for example a software application stored in a memory 32 of a data processing unit 34 and executable by a processor 36 of the data processing unit 34. In a variant, the processing module 30 is provided in the form of a specific integrated circuit or programmable logic circuit.

The invention is not limited to the example embodiments described above and illustrated in the drawing, as other example embodiments are conceivable.

In the illustrated example embodiment, the thermal isolation partition 12 is interposed between the lighting system 10 and the second image capture apparatus 8.

In a variant, as shown in dotted line in FIG. 1, the thermal isolation partition 12 is interposed between the first image capture apparatus 6 and the second image capture apparatus 8. This still protects the first image capture apparatus 6 from the heat emitted by the lighting system 10.

In another variant, the image capture device 2 comprises two thermal isolation partitions 12, one interposed between the first image capture apparatus 6 and the second image capture apparatus 8 (dotted line in FIG. 1), and the other interposed between the second image capture apparatus 8 and the lighting system 10.

The first image capture apparatus 6 is then separated from the lighting system 10 by the second image capture apparatus 8 and two thermal isolation partitions 12.

The second image capture apparatus 8 is then for example located in an intermediate compartment located between the two thermal isolation partitions 12.

The invention claimed is:

1. An image capture device for capturing images of a scene located within a field of view of the image capture device, wherein the scene located within the field of view of the image capture device is configured to include a passenger compartment of a motor vehicle, the image capture device comprising a housing within which are positioned a first image capture apparatus configured to acquire images in a first wavelength range, the first image capture apparatus being a thermal camera or a thermal photographic apparatus, a second image capture apparatus configured to acquire images in a second wavelength range separate from the first wavelength range, and an illumination system comprising at least one radiation source and configured to emit radiation from each radiation source in the second wavelength range, the image capture device further comprising a thermal isolation partition positioned within the housing and interposed between the first image capture apparatus and the illumination system so as to thermally isolate the first image capture apparatus from the illumination system, wherein the thermal isolation partition delimits a first compartment and a second compartment within the housing, the first compartment and the second compartment being thermally isolated from each other by the thermal isolation partition.

2. The image capture device according to claim 1, wherein the second image capture apparatus is positioned within the housing by being interposed between the first image capture apparatus and the illumination system.

3. The image capture device according to claim 2, wherein the thermal isolation partition is positioned within the housing by being interposed between the second image capture apparatus and the illumination system.

4. The image capture device according to claim 1, wherein the first wavelength range is within a wavelength band between 1.4 μm and 1,000 μm.

5. The image capture device according to claim 1, wherein the second image capture apparatus is a near infrared photographic apparatus or a near infrared camera.

6. The image capture device according to claim 1, wherein the second wavelength range is within a wavelength band between 0.750 μm and 1.4 μm.

7. The image capture device according claim 1, wherein the illumination system is configured not to emit radiation in the first wavelength range with each radiation source.

8. The image capture device according to claim 1, wherein each radiation source is a light emitting diode.

9. The image capture device according to claim 1, wherein the first image capture apparatus, the second image capture apparatus, the thermal isolation partition, and the illumination system are aligned along an alignment direction E which is perpendicular to a viewing axis of the image capture device.

10. The image capture device according to claim 1, wherein the first image capture apparatus, the second image capture apparatus, the thermal isolation partition, and the illumination system are arranged within the housing in the order of the first image capture apparatus, the second image capture apparatus, the thermal isolation partition, and the illumination system along an alignment direction.

11. The image capture device according to claim 1, wherein the second image capture apparatus and the thermal isolation partition are located between the first image capture apparatus and the illumination system.

12. The image capture device according to claim 1, wherein the thermal isolation partition is positioned between the first image capture apparatus and the illumination system.

13. The image capture device according to claim 1, wherein the thermal isolation partition is positioned between the second image capture apparatus and the illumination system.

14. The image capture device according to claim 1, wherein the first image capture apparatus is received in the first compartment and the illumination system is received in the second compartment.

15. The image capture device according to claim 1, wherein the second image capture apparatus is received in the first compartment.

16. The image capture device according to claim 1, wherein the second image capture apparatus is received in the first compartment, the second image capture apparatus being interposed between the first image capture apparatus and the thermal isolation partition.

17. The image capture device according to claim 1, wherein the thermal isolation partition separates the first compartment and the second compartment in a sealed manner.

18. A motor vehicle having a passenger compartment, the motor vehicle comprising an image capture device arranged in the motor vehicle for capturing images of a scene located within a field of view of the image capture device, the field of view of the image capture device including the passenger compartment of the motor vehicle, the image capture device comprising a housing within which are positioned a first image capture apparatus configured to acquire images in a first wavelength range, the first image capture apparatus being a thermal camera or a thermal photographic apparatus, a second image capture apparatus configured to acquire images in a second wavelength range separate from the first wavelength range, and an illumination system comprising at least one radiation source and configured to emit radiation from each radiation source in the second wavelength range, the image capture device further comprising a thermal isolation partition positioned within the housing and interposed between the first image capture apparatus and the illumination system so as to thermally isolate the first image capture apparatus from the illumination system, wherein the thermal isolation partition delimits a first compartment and a second compartment within the housing, the first compartment and the second compartment being thermally isolated from each other by the thermal isolation partition.

19. A motor vehicle having a passenger compartment, the motor vehicle comprising an image capture device arranged in the motor vehicle for capturing images of a scene located within a field of view of the image capture device, the field of view of the image capture device including the passenger compartment of the motor vehicle, the image capture device comprising a housing comprising a front face facing the field of view of the image capture device, the housing comprising a first image capture apparatus configured to acquire images of the scene from the front face in a first wavelength range, the first image capture apparatus being a thermal camera or a thermal photographic apparatus, a second image capture apparatus configured to acquire images of the scene from the front face in a second wavelength range separate from the first wavelength range, and an illumination system comprising at least one radiation source to illuminate the scene from the front face and configured to emit radiation from each radiation source in the second wavelength range, wherein the front face comprises one or more apertures, with each of the first image capture apparatus, the second image capture apparatus and the illumination system being positioned opposite a related aperture to capture images of the scene through the related aperture or illuminate the scene through the related aperture, the image capture device further comprising a thermal isolation partition positioned within the housing and interposed between the first image capture apparatus and the illumination system so as to thermally isolate the first image capture apparatus from the illumination system, wherein the thermal isolation partition delimits a first compartment and a second compartment within the housing, the first compartment and the second compartment being thermally isolated from each other by the thermal isolation partition.

* * * * *